(12) United States Patent
Okuyama et al.

(10) Patent No.: US 11,736,956 B2
(45) Date of Patent: Aug. 22, 2023

(54) BASE STATION

(71) Applicant: NTT DOCOMO, INC., Tokyo (JP)

(72) Inventors: Suguru Okuyama, Tokyo (JP); Anil Umesh, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 67 days.

(21) Appl. No.: 17/057,512

(22) PCT Filed: Jan. 24, 2019

(86) PCT No.: PCT/JP2019/002219
§ 371 (c)(1),
(2) Date: Nov. 20, 2020

(87) PCT Pub. No.: WO2019/225056
PCT Pub. Date: Nov. 28, 2019

(65) Prior Publication Data
US 2021/0204144 A1     Jul. 1, 2021

(30) Foreign Application Priority Data

May 23, 2018     (JP) .................................. 2018-099056

(51) Int. Cl.
| | | |
|---|---|---|
| H04W 16/28 | (2009.01) | |
| H04B 7/0456 | (2017.01) | |
| H04B 7/06 | (2006.01) | |
| H04W 88/08 | (2009.01) | |
| H04W 92/10 | (2009.01) | |

(52) U.S. Cl.
CPC .......... *H04W 16/28* (2013.01); *H04B 7/0456* (2013.01); *H04B 7/0617* (2013.01); *H04W 88/08* (2013.01); *H04W 92/10* (2013.01)

(58) Field of Classification Search
CPC ..... H04W 16/28; H04W 88/08; H04W 92/10; H04W 88/085; H04W 92/12; H04B 7/0456; H04B 7/0617; H04B 7/0413; H04B 7/022
See application file for complete search history.

(56) References Cited

U.S. PATENT DOCUMENTS

| | | | | |
|---|---|---|---|---|
| 2013/0294419 A1* | 11/2013 | Heiser | ................... | H04W 28/16 370/336 |
| 2015/0124769 A1* | 5/2015 | Zhang | .................. | H04B 7/0634 370/329 |

(Continued)

FOREIGN PATENT DOCUMENTS

WO     2018236867 A2     12/2018

OTHER PUBLICATIONS

International Search Report issued in PCT/JP2019/002219 dated Mar. 19, 2019 (5 pages).

(Continued)

*Primary Examiner* — Abdullahi Ahmed
(74) *Attorney, Agent, or Firm* — Osha Bergman Watanabe & Burton LLP

(57) ABSTRACT

A base station includes a first unit that performs radio transmission of a signal to a terminal, a second unit, and an interface that connects the first unit to the second unit. In order to determine which of the first unit and the second unit is a unit that performs precoding, information indicating whether or not at least one of the first unit and the second unit has a function of the precoding is sent over the interface.

2 Claims, 9 Drawing Sheets

(56) References Cited

U.S. PATENT DOCUMENTS

| | | | | |
|---|---|---|---|---|
| 2018/0279342 A1* | 9/2018 | Takiguchi | ............ | H04W 88/085 |
| 2019/0044580 A1* | 2/2019 | Zhou | .................. | H04W 72/085 |
| 2020/0212972 A1* | 7/2020 | Zhang | ................. | H04B 7/0456 |
| 2021/0243617 A1* | 8/2021 | Cooper | ............. | H04W 72/0453 |
| 2022/0086817 A1* | 3/2022 | Abedini | ................ | H04W 52/46 |
| 2022/0086890 A1* | 3/2022 | Kim | ................. | H04W 72/1289 |

OTHER PUBLICATIONS

Written Opinion of the International Searching Authority issued in PCT/JP2019/002219 dated Mar. 19, 2019 (5 pages).

3GPP TR 38.816 V15.0.0; "3rd Generation Partnership Project; Technical Specification Group Radio Access Network Study on CU-DU lower layer split for NR (Release 15)"; Dec. 2017 (16 pages).

3GPP TR 38.801 V14.0.0; "3rd Generation Partnership Project; Technical Specification Group Radio Access Network Study on new radio access technology: Radio access architecture and interfaces (Release 14)"; Mar. 2017 (91 pages).

3GPP TSG-RAN WG3 Meeting #96; R3-171703 "F1 interface setup and the delivery of gNB-DU capability" Samsung, KT, SK Telecom; Hangzhou, P.R. China; May 15-19, 2017 (4 pages).

3GPP TSG-RAN WG3 Meeting #95; R3-170416 "TP of Clean up for functional split" Nokia, Alcatel-Lucent Shanghai Bell; Athens, Greece; Feb. 13-17, 2017 (12 pages).

Extended European Search Report issued in European Application No. 19807419.7, dated Feb. 10, 2022 (13 pages).

Office Action issued in Japanese Application No. 2020-521011; dated Aug. 30, 2022 (6 pages).

\* cited by examiner

| Parameter | Value | Description |
|---|---|---|
| DU precoding function | 0 or 1 | 0: DU does't have precoding function<br>1: DU has precoding function |
| BF type at DU | 0, 1 or 2 | 0: DU does't have BF function<br>1: DU has ABF function (doesn't have DBF function)<br>2: DU has DBF function |

FIG. 5

| Parameter | Value | Description |
|---|---|---|
| CU precoding function | 0 or 1 | 0: CU does't have precoding function<br>1: CU has precoding function |

FIG. 6

| | | | CU | |
|---|---|---|---|---|
| | | | w/ precoding function | w/o precoding function |
| DU | 1) w/o BF function | a) w/ precoding function | CU | DU |
| | | b) w/o precoding function | CU | Doesn't work. |
| | 2) w/ ABF function (w/o DBF) | a) w/ precoding function | CU | DU |
| | | b) w/o precoding function | CU | Doesn't work. |
| | 3) w/ DBF function | a) w/ precoding function | DU | DU |
| | | b) w/o precoding function | CU | Doesn't work. |

FIG. 7

| Parameter | Value | Description |
|---|---|---|
| Contents in ID | 0 or 1 | 0: Only Beam related information<br>1: Both Beam and Precoding related information |
| Beam Matrix | Complex matrix | Identity matrix when DU doesn't have BF function. |
| Precoding Matrix | Complex matrix | Note the only applicable when "Contents in ID" = 1. |

FIG. 9

BASE STATION

TECHNICAL FIELD

The present disclosure relates to a base station.

BACKGROUND ART

Studies have been conducted on a base station (also called "eNB" or "gNB") including: a unit for performing radio transmission of a signal to a terminal (also called "user terminal," "radio terminal," or "User Equipment (UE)," for example) (such a unit is called "Distributed Unit (DU)," for example) in a radio communication system; and a unit to be connected to the DU (such a unit is called "Central Unit (CU)," for example) (see, e.g., Non-Patent Literature (hereinafter referred to as "NPL") 1). For example, functions of the base station are split between the CU and the DU (functional split).

CITATION LIST

Non-Patent Literature

NPL 1
3GPP TR 38.816 V15.0.0 "Study on CU-DU lower layer split for NR; (Release 15)", December, 2017
NPL 2
3GPP TR 38.801 V14.0.0, "Study on new radio access technology: (Release 14) Radio access architecture and interfaces", March, 2017

SUMMARY OF INVENTION

Technical Problem

However, an interface that connects different units in the base station to each other has not been extensively studied.

Accordingly, one object of one aspect of the present disclosure is to send a signal efficiently over the interface that connects different units in the base station to each other.

Solution to Problem

A base station according to one aspect of the present disclosure includes: a first unit that performs radio transmission of a signal to a terminal; a second unit; and an interface that connects the first unit to the second unit, in which information for determining which of the first unit and the second unit is a unit that performs precoding is sent over the interface, in which the information indicates whether or not at least one of the first unit and the second unit has a function of the precoding.

Advantageous Effects of Invention

According to the present disclosure, a signal can be sent efficiently over an interface that connects different units in a base station to each other.

BRIEF DESCRIPTION OF DRAWINGS

FIG. 5 illustrates an example of DU function information according to Embodiment 1;

FIG. 6 illustrates an example of CU function information according to Embodiment 1;

FIG. 7 illustrates an example of a method of determining a functional split between the CU and the DU according to Embodiment 1;

FIG. 9 illustrates an example of information indicated from the CU to the DU according to Embodiment 2;

DESCRIPTION OF EMBODIMENTS

Hereinafter, an embodiment of the present disclosure will be described with reference to the accompanying drawings.

Embodiment 1

Figure 1:
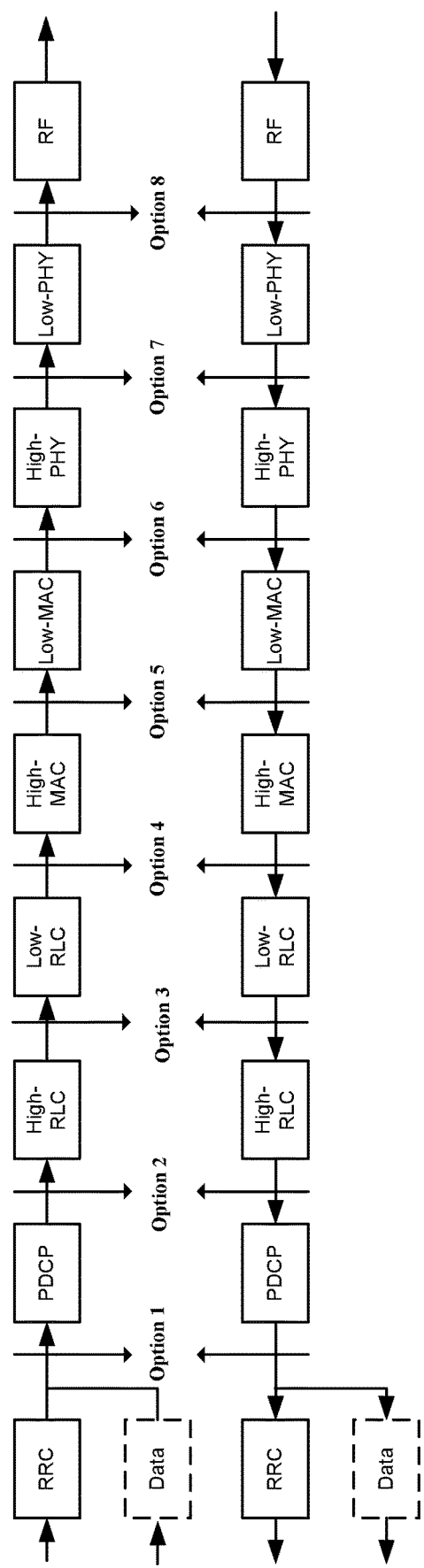
FIG. 1 illustrates an example of a splitting point between a CU and a DU.

FIG. 1 illustrates an example of functions of a base station in a radio communication system, for example (see, e.g., NPL 2).

Options 1 to 8 illustrated in FIG. 1 are defined as a boundary for splitting the functions of the base station between a CU and a DU (such a boundary is hereinafter referred to as "splitting point"), for example. In a case of a functional split called "Lower Layer Split (LLS)," for example, the functions of the CU (which may alternatively be referred to as "lls-CU") and the functions of the DU (which may alternatively be referred to as "lls-DU") are split from each other at Option 7 in FIG. 1. In other words, those functions of a higher physical layer (High-PHY) and of higher layers above the higher physical layer are allotted to the CU and those functions of a lower physical layer (Low-PHY) and of lower layers below the lower physical layer are allotted to the DU in the case of the splitting point of Option 7 as illustrated in FIG. 1.

Figure 2:
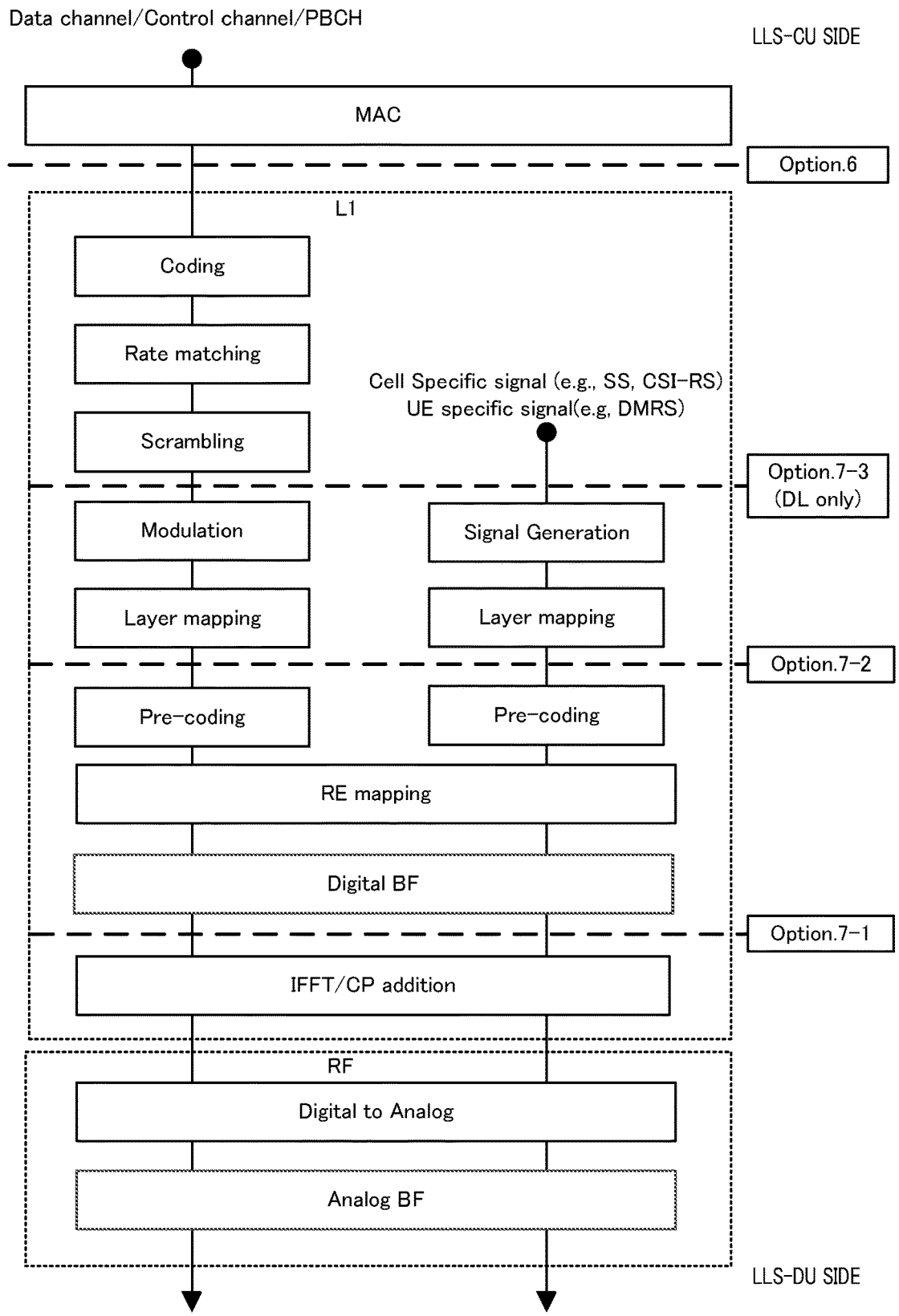
FIG. 2 illustrates an example of the splitting point between the CU and the DU in a physical layer.

Additionally, the splitting point is subdivided in the physical layer (in other words, in layer 1 (L1)) in Option 7 of LLS. FIG. 2 illustrates an example of the splitting point in the physical layer in downlink (DL). As illustrated in FIG. 2, the splitting point is one of Option 7-1, Option 7-2, and Option 7-3, for example.

In a case of Option 7-1, the functions of Inverse Fast Fourier Transform (IFFT) and Cyclic Prefix (CP) addition of the physical layer belong to the DU and the remaining functions of the physical layer belong to the CU.

Alternatively, in a case of Option 7-2, the functions of IFFT and CP addition, a Digital BeamForming (Digital BF; DBF) function, a resource mapping function (or Resource Element (RE) mapping function), and a precoding function of the physical layer belong to the DU, and the remaining functions of the physical layer belong to the CU.

Alternatively, in a case of Option 7-3, a coding function (e.g., coding, rate matching, and scrambling) of the physical layer belongs to the CU, and the remaining functions of the physical layer belong to the DU.

Note that, the splitting point between the functions of the CU and the DU is not limited to Option 7-1, Option 7-2, or Option 7-3 illustrated in FIG. 2, but a point other than the splitting point corresponding to Option 7-1, Option 7-2, or Option 7-3 may also be configured as the splitting point.

For example, there are the precoding function and the DBF function between Option 7-1 and Option 7-2 (or Option 7-3) as illustrated in FIG. 2. Accordingly, the suitable splitting point between the functions of the CU and the DU is different depending on whether or not each of the CU and the DU has the precoding function or the DBF function, for example.

The present embodiment will be described in relation to a method of suitably determining the functional split between the CU and the DU depending on the functions that the CU has and the functions that the DU has. The present embodiment will also be described in relation to the method of determining the functional split between the CU and the DU by sending common control information for various combinations of the functions of the CU and the DU over an interface that connects the CU to the DU (such an interface may also be referred to as "FrontHaul (FH) interface," for example).

This method makes it possible to send, over the FH interface, a signal usable for the various combinations of the functions of the CU and the DU in common, so as to suitably determine the functional split between the CU and the DU irrespective of the functions that the CU has and the functions that the DU has.

[Configuration of Radio Communication System]

The radio communication system according to the present embodiment includes base station 100 and at least one terminal 200, for example.

Figure 3:
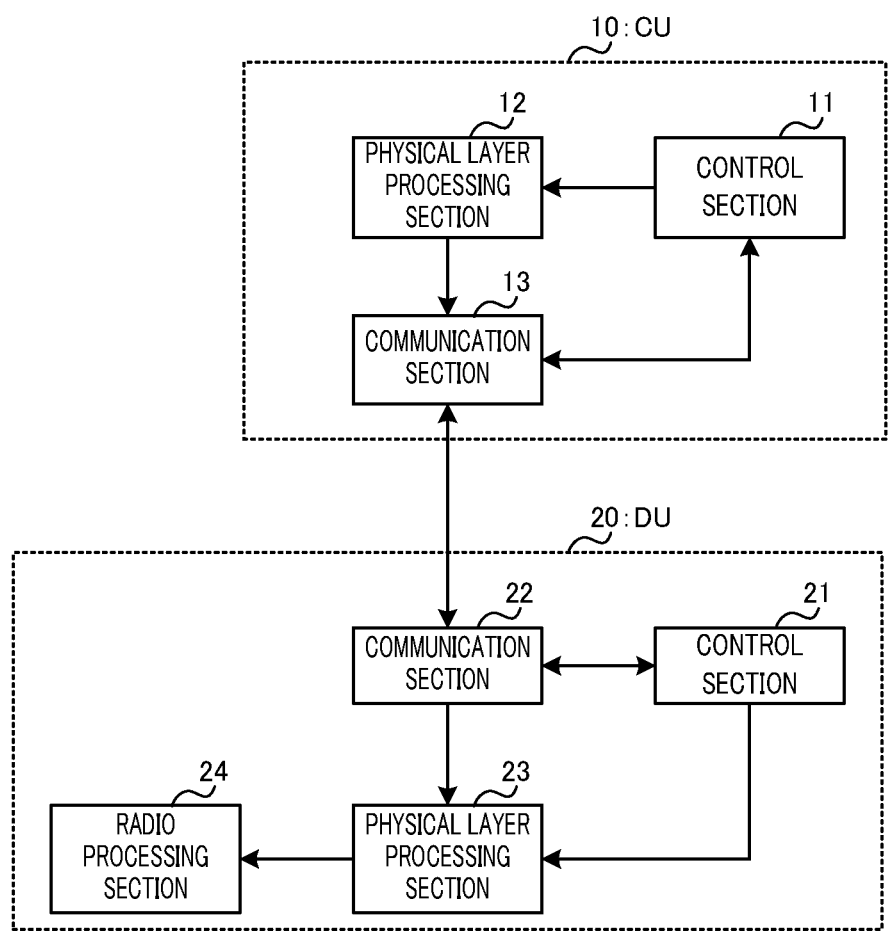
FIG. 3 is a block diagram illustrating an example of a configuration of a base station according to Embodiment 1.

FIG. 3 is a block diagram illustrating an example of a configuration of base station 100. Base station 100 illustrated in FIG. 3 includes CU 10 and at least one DU 20. Each DU 20 is connected to CU 10. Note that, the configuration illustrated in FIG. 3 is a configuration related to transmission of a downlink signal (hereinafter, referred to as "DL signal"), and illustration of a configuration related to reception of an uplink (UL) signal is omitted.

CU 10 illustrated in FIG. 3 includes control section 11, physical layer processing section 12, and communication section 13.

Control section 11 holds the information on the functions that CU 10 has (this information is hereinafter referred to as "CU function information"). The CU function information may be generated in control section 11, or may also be output to control section 11 from another component section (not illustrated) of CU 10, for example. In addition, control section 11 obtains information on the functions that DU 20 has (this information is hereinafter referred to as "DU function information") from DU 20 via communication section 13 (in other words, via the FH interface).

Here, the CU function information is information indicating whether or not CU 10 has a function to perform spatial processing (e.g., precoding function or DBF function) and the DU function information is information indicating whether or not DU 20 has the function to perform the spatial processing, for example. For example, the CU function information includes a parameter indicating whether or not CU 10 has the precoding function. The DU function information includes a parameter indicating whether or not DU 20 has the precoding function and a parameter related to a BeamForming (hereinafter, referred to as "BF") function of DU 20, for example. The parameter related to the BF function indicates whether or not DU 20 has the BF function, and also indicates the type of BF (e.g., Analog Beam-Forming (ABF) or DBF), for example.

Control section 11 determines part of the physical layer processing in base station 100 to be performed by CU 10 and part of the physical layer processing in base station 100 to be performed by DU 20 based on the CU function information and the DU function information. For example, control section 11 determines based on the CU function information and the DU function information which of CU 10 and DU 20 is a unit that performs the precoding processing. In other words, control section 11 determines the splitting point (e.g., Option 7-1, Option 7-2, or Option 7-3 illustrated in FIG. 2) between the functions that base station 100 has based on the CU function information and the DU function information.

Control section 11 indicates the part of the physical layer processing to be performed by CU 10 to physical layer processing section 12 based on the determined information (hereinafter, referred to as "functional split information"). Moreover, control section 11 indicates the determined functional split information to DU 20 via communication section 13 (in other words, via the FH interface).

Note that, the method performed in control section 11, of determining the functions for the CU 10 and DU 20 will be described in detail below.

Physical layer processing section 12 performs the part of the physical layer processing indicated from control section 11 (in other words, part of the physical layer processing assigned to CU 10) on the DL signal. Physical layer processing section 12 outputs the resulting DL signal to communication section 13.

Note by way of an example that, the DL signal is a data channel signal, control channel signal, broadcast signal (Physical Broadcast Channel (PBCH)), cell-specific signal (e.g., Synchronization Signal (SS)), Channel State Information Reference Signal (CSI-RS), or terminal-specific signal (e.g., Demodulation Reference Signal (DMRS)) as illustrated in FIG. 2.

Communication section 13 is the FH interface that connects CU 10 to DU 20. For example, communication section 13 receives the DU function information transmitted from DU 20, and outputs the DU function information to control section 11. Communication section 13 also transmits the functional split information input from control section 11 to DU 20, for example. Communication section 13 also transmits the DL signal input from physical layer processing section 12 to DU 20, for example.

DU 20 illustrated in FIG. 3 includes control section 21 communication section 22, physical layer processing section 23, and radio processing section 24.

Control section 21 generates the DU function information on the functions that DU 20 has. The DU function information includes the parameter indicating whether or not DU 20 has the precoding function and the parameter related to BF by DU 20 (whether or not DU 20 has the BF function and the type of BF), for example. Control section 21 outputs the generated DU function information to communication section 22.

In addition, control section 21 indicates the part of the physical layer processing to be performed by DU 20 to physical layer processing section 23 based on the functional split information obtained from CU 10 via communication section 22 (in other words, via the FH interface).

Communication section 22 is the FH interface that connects DU 20 to CU 10. For example, communication section 22 transmits the DU function information input from control section 21 to CU 10, for example. Additionally, communication section 22 receives the functional split information transmitted from CU 10, and outputs the functional split information to control section 21, for example. Additionally, communication section 22 receives the DL signal transmitted from CU 10, and outputs the DL signal to physical layer processing section 23.

Physical layer processing section 23 performs the part of the physical layer processing indicated from control section 21 (in other words, the part of the physical layer processing assigned to DU 20) on the DL signal input from communication section 22. Physical layer processing section 23 outputs the resulting DL signal to radio processing section 24.

Radio processing section 24 performs radio processing on the DL signal input from physical layer processing section 23, and performs radio transmission of the signal subjected to the radio processing to terminal 200. Examples of the radio processing include digital to analog (D/A) conversion and ABF as illustrated in FIG. 2.

[Operation of Base Station]

Next, an operation example of base station 100 described above will be described particularly.

Figure 4:
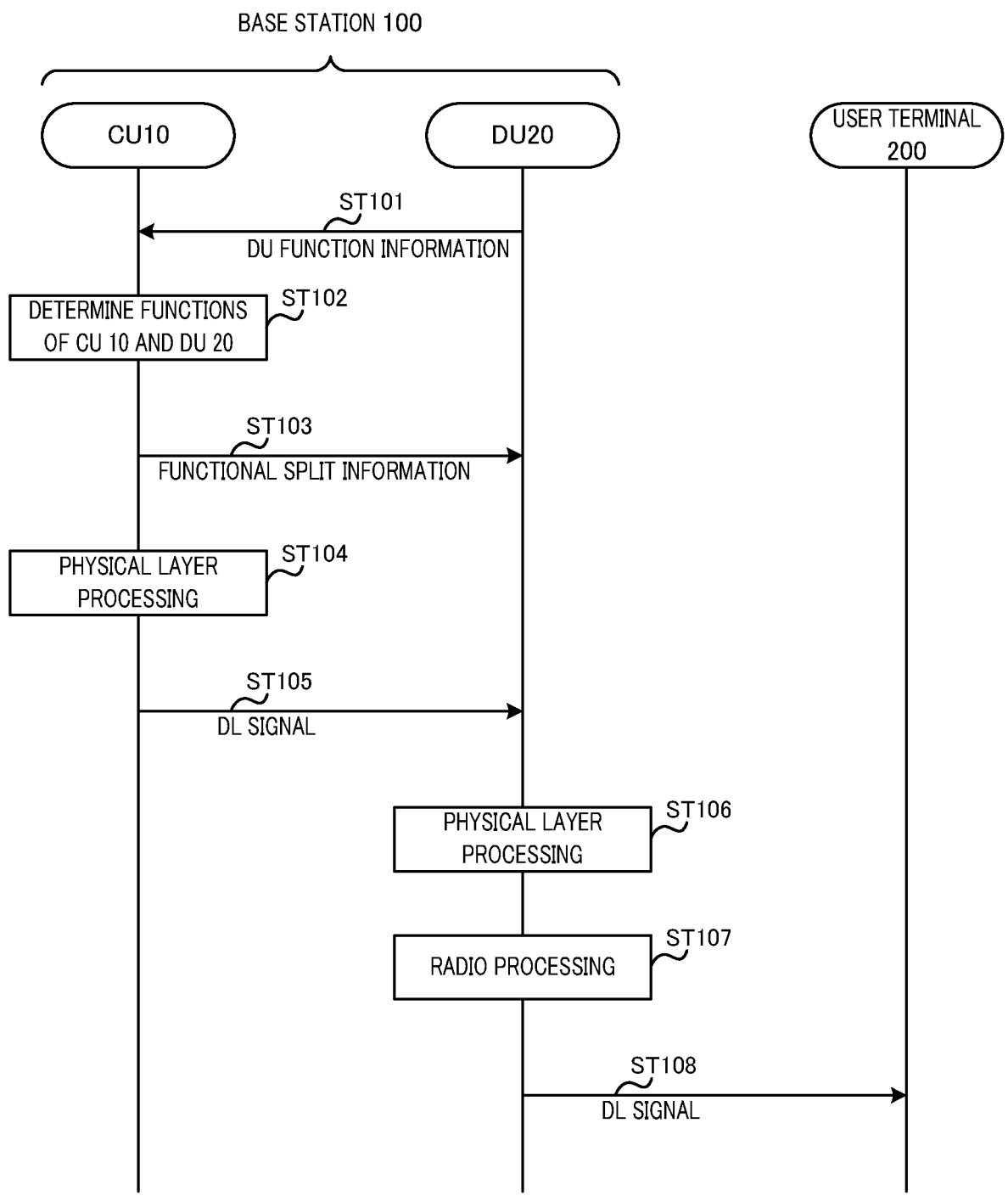
FIG. 4 is a sequence diagram illustrating an operation example of the base station according to Embodiment 1.

FIG. 4 is a sequence diagram illustrating the operation example of base station 100 (e.g., of CU 10 and DU 20).

DU 20 transmits, to CU 10, the DU function information of DU 20 over the FH interface that connects CU 10 to DU 20 (ST101) as illustrated in FIG. 4.

FIG. 5 illustrates an example of the DU function information. FIG. 5 illustrates the DU function information including the parameter indicating whether or not DU 20 has the precoding function (e.g., "DU precoding function") and the parameter related to the BF function of DU 20 (e.g., "BF type at DU").

For example, value "0" of the "DU precoding function" indicates that DU 20 does not have the precoding function and value "1" indicates that DU 20 has the precoding function. Note that, the values of "DU precoding function" illustrated in FIG. 5 are mere examples, and may also be values other than those illustrated in FIG. 5.

In addition, value "0" of the "BF type at DU" indicates that DU 20 does not have the BF function, value "1" indicates that DU 20 has the ABF function but does not have the DBF function, and value "2" indicates that DU 20 has the DBF function. Note that, the values of the "BF type at DU" illustrated in FIG. 5 are mere examples, and may also be values other than those illustrated in FIG. 5.

In FIG. 4, CU 10 determines the functions carried out by CU 10 and the functions carried out by DU 20 based on the DU function information and the CU function information of CU 10 (ST102).

FIG. 6 illustrates an example of the CU function information. FIG. 6 illustrates the CU function information including the parameter indicating whether or not CU 10 has the precoding function (e.g., "CU precoding function"). For example, value "0" of the "CU precoding function" indicates that CU 10 does not have the precoding function and value "1" indicates that CU 10 has the precoding function. Note that, the values of the "CU precoding function" illustrated in FIG. 6 are mere examples, and may also be values other than those illustrated in FIG. 6.

For example, CU 10 determines at ST102 illustrated in FIG. 4 which of CU 10 and DU 20 is the unit that performs the precoding processing. In other words, among candidates for the splitting point in the physical layer, CU 10 selects the splitting point causing the precoding function to be included in the CU 10 side (e.g., Option 7-1) or the splitting point causing the precoding function to be included in the DU 20 side (e.g., Option 7-2 or Option 7-3) as illustrated in FIG. 2.

Note that, a method of determining a device that performs the precoding processing at ST102 will be described in detail below.

In FIG. 4, CU 10 transmits, to DU 20, the functional split information indicating the functions allotted to CU 10 and the functions allotted to DU 20 (or splitting point) (ST103). Note that, the transmission timing of the functional split information is not limited to one example illustrated in FIG. 4. For example, the functional split information may be transmitted after the processing of ST104 and before the processing of ST105, or may also be transmitted with the DL signal at the processing of ST105.

CU 10 performs the physical layer processing on the DL signal for the functions assigned to CU 10 (ST104). CU 10 transmits the DL signal subjected to the physical layer processing to DU 20 (ST105).

DU 20 performs the physical layer processing on the DL signal for the functions assigned to DU 20 based on the functional split information transmitted from CU 10 (ST106). DU 20 performs the radio processing on the DL signal subjected to the physical layer processing (ST107). DU 20 performs radio transmission of the DL signal to terminal 200 (ST108).

Next, the method of determining the functions of CU 10 and DU 20 (e.g., processing at ST102 illustrated in FIG. 4) will be described.

By way of an example, FIG. 7 illustrates an example of processing for determining the device that performs the precoding processing.

As illustrated in FIG. 7, depending on the combination of the DU function information (e.g., "DU precoding function" and "BF type at DU" illustrated in FIG. 5) and the CU function information (e.g., "CU precoding function" illustrated in FIG. 6), CU 10 determines which of CU 10 and DU 20 is the device that performs the precoding processing.

For example, when one device of CU 10 and DU 20 has the precoding function and the other device does not have the precoding function, CU 10 determines the device having the precoding function as the device that performs the precoding processing.

Alternatively, when both of CU 10 and DU 20 do not have the precoding function, CU 10 determines that the precoding processing is not applied to the DL signal (e.g., "Doesn't work" illustrated in FIG. 7).

Alternatively, when both of CU 10 and DU 20 have the precoding function (e.g., shaded part of FIG. 7), CU 10 determines the device that performs the precoding processing based on the BF function of DU 20.

For example, when both of CU 10 and DU 20 have the precoding function and DU 20 does not have the BF function, CU 10 determines CU 10 as the device that performs the precoding processing as illustrated in FIG. 7. For example, CU 10 may select Option 7-1 illustrated in FIG. 2. In this case, CU 10 performs the precoding processing on the DL signal at ST104 of FIG. 4.

Accordingly, both of the precoding processing and the DBF processing can be performed at CU 10 collectively, for example, as illustrated in Option 7-1 of FIG. 2. In other words, complex-valued computations in the digital domain including the precoding processing and the DBF processing can be carried out at a single unit. Moreover, the precoding processing can be performed at CU 10 having a processing capacity higher than that of DU 20. Thus, the processing efficiency in the physical layer in base station 100 can be increased.

Alternatively, when both of CU 10 and DU 20 have the precoding function and when DU 20 has the ABF function but does not have the DBF function, CU 10 determines CU 10 as the device that performs the precoding processing, for example, as illustrated in FIG. 7. For example, CU 10 may select Option 7-1 illustrated in FIG. 2. In this case, CU 10 performs the precoding processing on the DL data at ST104 of FIG. 4.

Accordingly, both of the precoding processing and the DBF processing can be performed at CU 10 collectively, for example, as illustrated in Option 7-1 of FIG. 2. In other words, the complex-valued computations in the digital domain including the precoding processing and the DBF processing can be carried out at a single unit. Moreover, the precoding processing can be performed at CU 10 having a processing capacity higher than that of DU 20. Thus, the processing efficiency in the physical layer in base station 100 can be increased.

Alternatively, when both of CU 10 and DU 20 have the precoding function and when DU 20 has the DBF function, CU 10 determines DU 20 as the device that performs the precoding processing, for example, as illustrated in FIG. 7. For example, CU 10 may select Option 7-2 or Option 7-3 illustrated in FIG. 2. In this case, DU 20 performs the precoding processing on the DL data at ST104 of FIG. 4.

Accordingly, both of the precoding processing and the DBF processing can be performed at DU 20 collectively, for example, as illustrated in Option 7-2 or Option 7-3 of FIG. 2. In other words, the complex-valued computations in the digital domain including the precoding processing and the DBF processing can be carried out at a single unit, so that the processing efficiency in the physical layer in base station 200 can be increased. Moreover, with DU 20 performing the precoding processing, the computational amount of the physical layer processing at CU 10 can be reduced.

The method of determining the functions of CU 10 and DU 20 has been described above.

Note that, the description has been given with reference to FIG. 7 in relation to the case where CU 10 performs the precoding processing when both of CU 10 and DU 20 have the precoding function and DU 20 does not have the BF function (or DBF function). However, DU 20 may also perform the precoding processing when both of CU 10 and DU 20 have the precoding function and DU 20 does not have the BF function (or DBF function). DU 20 performs the precoding processing, so that the computational amount of the physical layer processing at CU 10 can be reduced.

Note also that, the description has been given with reference to FIG. 7 in relation to the case where DU 20 performs the precoding processing when both of CU 10 and DU 20 have the precoding function and DU 20 has the DBF function. However, CU 10 may also perform the precoding processing when both of CU 10 and DU 20 have the precoding function and DU 20 has the DBF function. CU 10 having a processing capacity higher than that of DU 20 performs the precoding processing, so that the processing efficiency in the physical layer in base station 100 can be increased.

As described above, in base station 100, the information indicating whether or not at least one of CU 10 and DU 20 has the precoding function (e.g., DU function information) is sent over the FH interface that connects CU 10 to DU 20 that performs radio transmission of the DL signal to terminal 200. Additionally, in base station 100, the DU function information sent over the FH interface indicates whether or not DU 20 has the DBF function. For example, based on the CU function information indicating whether or not CU 10 has the precoding function and based on the aforementioned DU function information obtained via the FH interface, CU 10 determines which of CU 10 and DU 20 is the unit that performs the precoding.

In other words, in base station 100, CU 10 and DU 20 share the information on the functions that CU 10 has and the functions that DU 20 has, and the functional split between CU 10 and DU 20 is determined in advance of the physical layer processing. This makes it possible for base station 100 to suitably split the functions for CU 10 and DU 20 depending on the functions that CU 10 has and the functions that DU 20 has.

In addition, base station 100 determines the functional split between CU 10 and DU 20 by sending the common control information (e.g., information indicating whether or not DU 20 has the spatial processing function) for the various combinations of the functions of CU 10 and DU 20 over the FH interface. This makes it possible for base station 100 to send a signal efficiently over the FH interface that connects different units in base station 100 (e.g., CU 10 and DU 20) to each other. In other words, base station 100 does not need to perform different processing or to send different control information for each of the various combinations of the functions of CU 10 and DU 20 over the FH interface.

Additionally, for example, information indicating whether or not each of CU 10 and DU 20 has the function of performing complex-valued computation processing (e.g., precoding function and DBF function) is used in determination of the unit that performs the precoding processing according to the present embodiment. For example, CU 10 determines, as the device that performs precoding, one of CU 10 and DU 20 which is capable of carrying out both of the complex-valued computation processing of the precoding function and the complex-valued computation processing of the DBF function collectively. This makes it possible to efficiently perform the spatial processing including the complex-valued computations in the digital domain in base station 100.

Variation 1 of Embodiment 1

Note that, the present embodiment has been described in relation to the case where CU 10 determines the functional split between CU 10 and DU 20. However, the device that determines the functional split between CU 10 and DU 20 is not limited to CU 10.

For example, DU 20 may also determine the functional split between CU 10 and DU 20. In this case, the CU function information indicating whether or not CU 10 has the precoding function (see, e.g., FIG. 6) is sent to DU 20 over the FH interface, for example. For example, DU 20 may determine the device that performs the precoding processing based on the CU function information and the DU function information that DU 20 holds (see, e.g., FIG. 5). This allows reduction in the computational amount at CU 10.

Alternatively, each of CU 10 and DU 20 may judge the functional split between CU 10 and DU 20. In this case, the CU function information indicating whether or not CU 10 has the precoding function (see, e.g., FIG. 6) is sent over the FH interface to DU 20, for example. Further, the DU function information indicating whether or not DU 20 has the precoding function and the BF function (see, e.g., FIG. 5) is sent over the FH interface to CU 10.

Alternatively, another device other than CU 10 and DU 20 may also determine the functional split between CU 10 and DU 20. In this case, the CU function information or the DU function information may be sent to the other device via the FH interface, for example.

Variation 2 of Embodiment 1

The present embodiment has also been described in relation to the case where the unit that performs the precoding processing is determined depending on the functions that CU 10 has and the functions that DU 20 has. However, the information for determining the unit that performs the precoding processing is not limited to the information indicating the functions that CU 10 has and the functions that DU 20 has.

For example, the unit that performs the precoding processing may also be determined depending on a function that CU 10 actually uses and a function that DU 20 actually uses. In other words, the information indicating whether or not CU 10 or DU 20 uses the precoding function or DBF function may be sent over the FH interface in order to determine the unit that performs the precoding processing.

For example, in a case where the DBF function is not actually used at DU 20 even when DU 20 has the DBF function, the same operation as performed in the case of FIG. 7 where DU 20 does not have the DBF function (e.g., in the case where DU 20 does not have BF or in the case where DU 20 has the ABF function) may be performed.

This makes it possible to suitably determine the functional split between CU 10 and DU 20 depending on usable functions at CU 10 and DU 20.

Variation 3 of Embodiment 1

Additionally or alternatively, the "BF type at DU" of the DU function information illustrated in FIG. 5 may be a value indicating whether or not the DU has the DBF function (e.g., value indicating 0 or 1), for example. Alternatively, the "BF type at DU" may also be a value indicating whether the DU has the BF function (e.g., value indicating 0 or 1), for example. The number of bits for the "BF type at DU" can be reduced in these cases.

For example, DU 20 may be determined as the unit that performs the precoding processing when both of CU 10 and DU 20 have the precoding function and when DU 20 has the DBF function (or, simply, the BF function). Accordingly, the complex-valued computations in the digital domain can be performed at DU 20 collectively, so that the processing efficiency can be increased. Additionally or alternatively, CU 10 may be determined as the unit that performs the precoding processing when both of CU 10 and DU 20 have the precoding function and when DU 20 does not have the DBF function (or, simply, the BF function). Accordingly, the complex-valued computations in the digital domain can be performed at CU 10 having a processing capacity higher than that of DU 20, so that the processing efficiency can be increased.

Alternatively, the unit that performs the precoding processing may be determined based on whether or not each of CU 10 and DU 20 has the precoding function and without use of the information on the BF function of DU 20. Note that, one of CU 10 and DU 20 only has to be determined as the unit that performs the precoding processing when both of CU 10 and DU 20 have the precoding function, for example. Accordingly, the information sent over the FH interface in order to determine the precoding processing can be reduced.

Variation 4 of Embodiment 1

Additionally or alternatively, the device that determines the unit that performs the precoding processing may be switched between CU 10 and DU 20 depending on a situation of at least one of CU 10 and DU 20, for example. For example, CU 10 may determine the unit that performs the precoding processing when the processing load in CU 10 is comparatively smaller. Accordingly, the functional split between CU 10 and DU 20 can be determined at CU 10 having a processing capacity comparatively higher than that of DU 20. Alternatively, DU 20 may determine the unit that performs the precoding processing when the processing load in CU 10 is comparatively larger. This makes it possible to prevent an increase in processing load in CU 10.

Embodiment 2

For example, there are the precoding function and the DBF function between Option 7-1 and Option 7-2 (or Option 7-3) as illustrated in FIG. 2. Therefore, the splitting point between the functions of the CU and the DU is different depending on whether or not each of the CU and the DU has the precoding function or the DBF function, for example.

For example, when the BF processing is performed but the precoding processing is not performed at the DU, the control information on BF (e.g., beam ID) is indicated from the CU to the DU. Meanwhile, when both of the BF processing and the precoding processing are performed at the DU, the control information on the precoding processing (e.g., Precoding Matrix Indicator (PMI)) in addition to the control information on BF is indicated from the CU to the DU. As understood, the control information to be indicated from the CU to the DU in Control Plane (C-Plane) or User Plane (U-Plane) is different depending on different splitting points between the functions of the CU and the DU, for example.

In this respect, the present embodiment will be described in relation to a method of suitably indicating control information to be indicated from the CU to the DU using common control information for the various combinations of the functions of the CU and the DU (in other words, using a common interface) over the FH interface that connects the CU to the DU.

[Configuration of Radio Communication System]

The radio communication system according to the present embodiment includes base station 300 and at least one terminal 200, for example.

Figure 8:
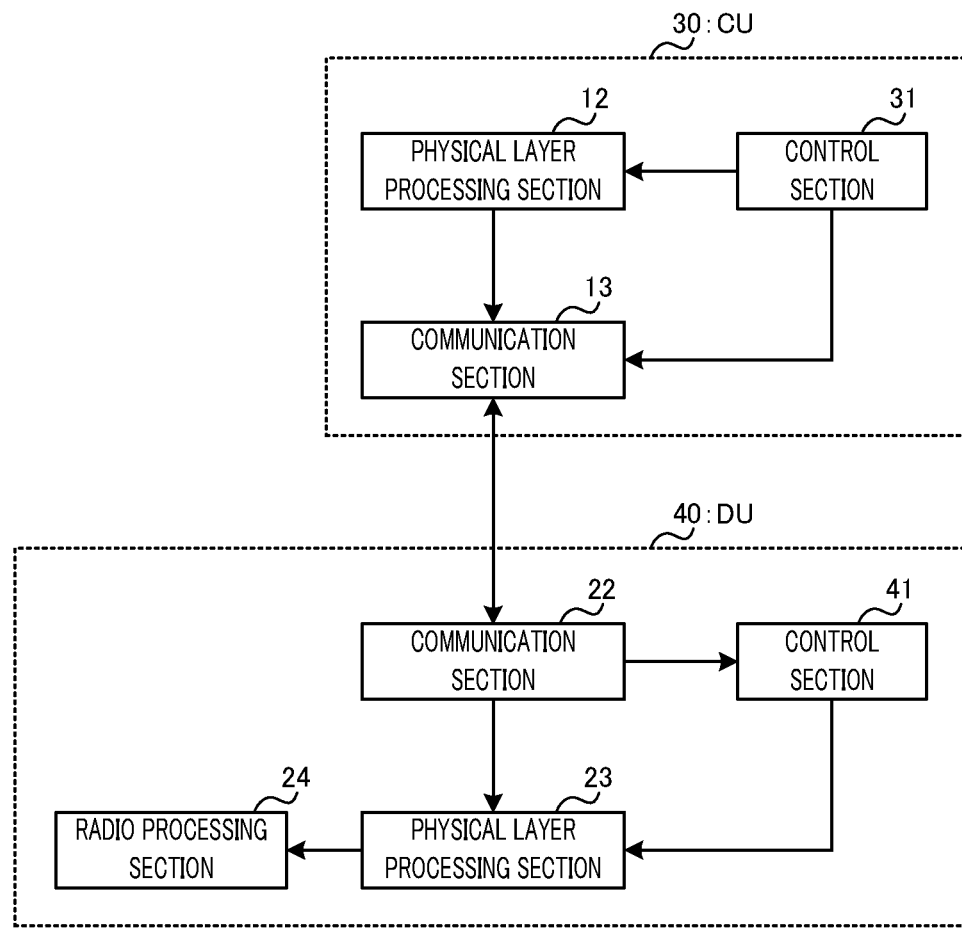
FIG. 8 is a block diagram illustrating an example of a configuration of a base station according to Embodiment 2.

FIG. 8 is a block diagram illustrating an example of a configuration of base station 300. Base station 300 illustrated in FIG. 8 includes CU 30 and at least one DU 40. Each DU 40 is connected to CU 30. Note that, the configuration related to DL signal transmission is illustrated and illustration of a configuration related to reception of a UL signal is omitted in FIG. 8. Note also that, the same component sections between Embodiment 1 (e.g., FIG. 3) and Embodiment 2 are provided with the same reference symbols, and descriptions of such component sections are omitted in FIG. 8.

CU 30 illustrated in FIG. 8 includes control section 31, physical layer processing section 12, and communication section 13.

Control section 31 indicates part of the physical layer processing in base station 300 to be performed by CU 30 to physical layer processing section 12. In addition, control section 31 generates control information to be indicated to DU 40 based on part of the physical layer processing in base station 300 to be performed by DU 40.

Note that, in the present embodiment, the functional split between CU 30 and DU 40 in the physical layer may be determined in accordance with the method described in Embodiment 1, for example.

The control information to be indicated from CU 30 to DU 40 over the FH interface that connects CU 30 to DU 40 includes matrix information indicating a matrix (which may also be referred to as rows and columns or weight, for example) that is a parameter used for spatial processing (e.g., BF or precoding) performed by DU 40, for example. The control information to be indicated from CU 30 to DU 40 over the FH interface also includes information indicating the type of spatial processing corresponding to the matrix included in the aforementioned matrix information, for example (such information indicating the type of the spatial processing is hereinafter referred to as "type information").

FIG. 9 illustrates an example of the control information to be indicated from CU 30 to DU 40.

The matrix information includes the parameter "Beam Matrix" indicating beam-related information (e.g., beam identifier (e.g., beam ID) indicating a beam matrix) as illustrated in FIG. 9. The matrix information also includes the parameter "Precoding Matrix" indicating precoding-related information (e.g., Precoding Matrix Indicator (PMI)) as illustrated in FIG. 9. The matrix information is called "ID," for example. Note that, the beam matrix may indicate an identity matrix when DU 40 does not have the BF function.

Additionally or alternatively, the type information "contents in ID" indicates either one of the case where the matrix information "ID" includes the beam-related information but does not include the precoding-related information (the case corresponding, e.g., to the value "0") and the case where the matrix information "ID" includes both of the beam-related and precoding-related information (the case corresponding, e.g., to the value "1") as illustrated in FIG. 9. In other words, "contents in ID" indicates whether or not the matrix information "ID" includes the precoding-related information.

For example, the type of the spatial processing corresponding to the matrix included in the matrix information "ID" is BF when the value of "contents in ID" is 0 in FIG. 9. In other words, the value of matrix information "ID" is associated with the beam ID (beam matrix) when the value of "contents in ID" is 0.

Further, the type of the spatial processing corresponding to the matrix included in the matrix information "ID" is both BF and precoding when the value of "contents in ID" is 1 in FIG. 9. In other words, the value of matrix information "ID" is associated with both of the beam ID (beam matrix) and the PMI (precoding matrix) when the value of "contents in ID" is 1.

As understood, the type of matrix associated with the matrix information "ID" is different depending on the type information "contents in ID." For example, even in a case where the matrix information (ID in FIG. 9) has the same value as in another case, the content of the spatial processing as indicated in the matrix information is different when the type information (Contents in ID of FIG. 9) has a different value.

Control section 31 outputs the type information and the matrix information to communication section 13 in FIG. 8. Note that, the type information is transmitted using the M-Plane from CU 30 to DU 40 over the FH interface that connects CU 30 to DU 40, for example. Note also that, the matrix information is transmitted using at least one of the C-Plane and U-Plane from CU 30 to DU 40 over the FH interface, for example.

DU 40 illustrated in FIG. 8 includes control section 41, communication section 22, physical layer processing section 23, and radio processing section 24.

Control section 41 determines, based on the type information transmitted from CU 30 via the FH interface, the content (BF or precoding) of the spatial processing indicated in the matrix information transmitted from CU 30. For example, control section 41 judges based on the type information whether the matrix information includes the beam-related information (e.g., beam ID) or both of the beam-related information and precoding-related information (e.g., beam ID and PMI). In other words, control section 41 judges based on the type information whether or not the precoding processing is performed at DU 40.

Control section 41 outputs the obtained matrix information to physical layer processing section 23.

[Operation of Base Station]

Next, an operation example of base station 300 described above will be described particularly.

Figure 10:
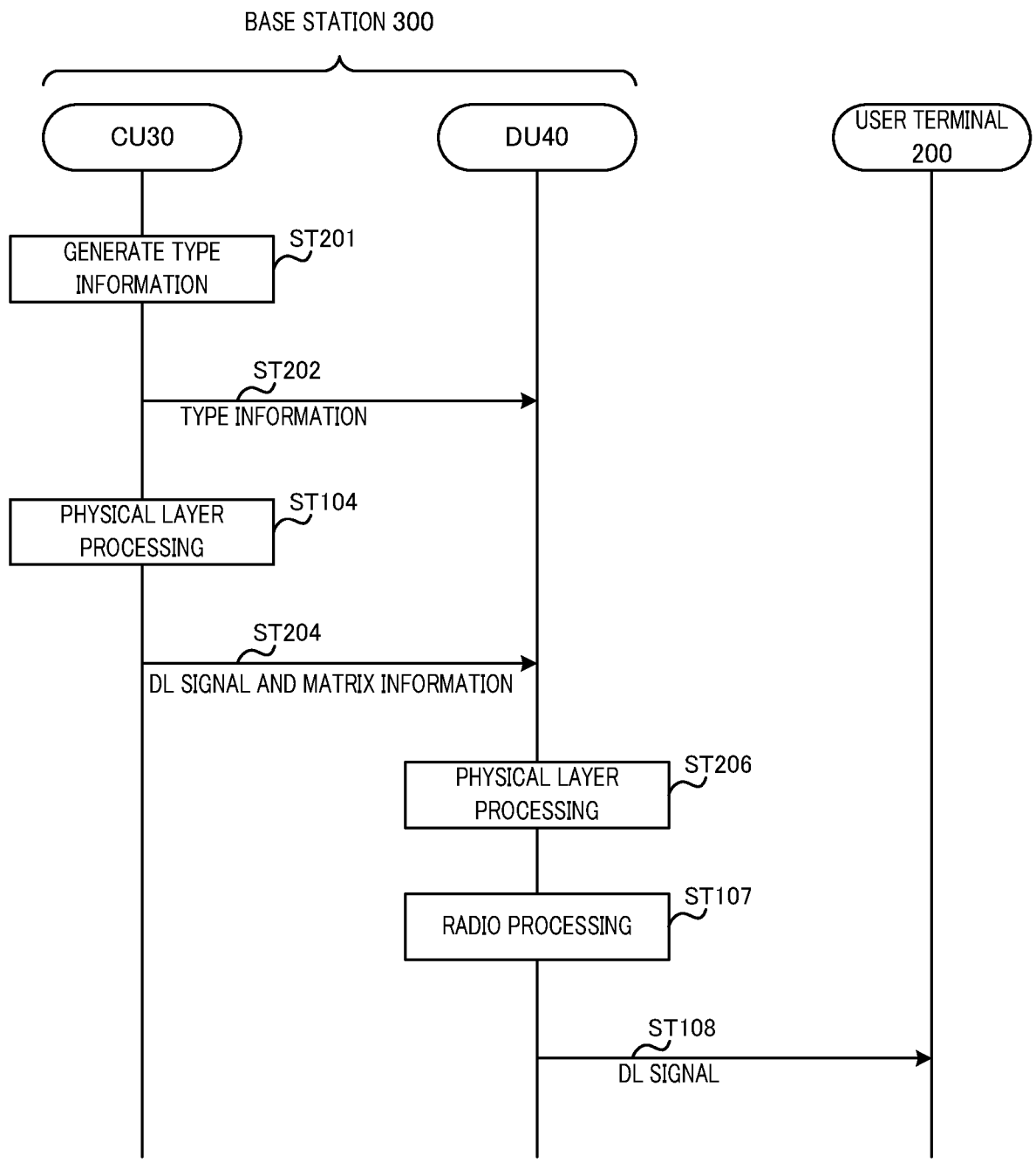
FIG. 10 is a sequence diagram illustrating an operation example of the base station according to Embodiment 2.

FIG. 10 is a sequence diagram illustrating the operation example of base station 300 (e.g., of CU 30 and DU 40). Note that, the same steps between Embodiment 1 (e.g., FIG. 4) and Embodiment 2 are provided with the same reference symbols, and descriptions of such steps are omitted in FIG. 10.

As illustrated in FIG. 10 (ST201), CU 30 generates the type information (e.g., "Contents in ID" illustrated in FIG. 9) indicating the type of the spatial processing corresponding to the parameter indicated in the matrix information based on the functions that CU 30 performs and the functions that DU 40 performs. CU 30 transmits the generated type information to DU 40 (ST202). The type information is transmitted, for example, over the FH interface using the M-Plane.

CU 30 transmits the matrix information indicating the matrix corresponding to the spatial processing performed by DU 40 (in other words, the matrix used for the spatial processing of the type corresponding to the type information), and the DL signal subjected to the physical layer processing to DU 40, for example (ST204). The matrix information and DL signal are transmitted, for example, over the FH interface using the C-Plane or U-Plane. Additionally, the matrix information and DL signal may also be transmitted to DU 40 at different timings.

DU 40 performs the physical layer processing on the DL signal based on the type information and matrix information transmitted from CU 30 (ST206).

For example, DU 40 judges that the matrix information "ID" is the beam-related information (e.g., beam ID indicating one of Beam Matrices) and does not include the precoding-related information when the value of the type information "Contents in ID" is 0 in FIG. 9. In other words, DU 40 judges that the precoding is not performed at DU 40.

Meanwhile, DU 40 judges that the matrix information "ID" is the beam-related and precoding-related information (e.g., beam ID indicating one of Beam Matrices and PMI indicating one of Precoding Matrices) when the value of the type information "Contents in ID" is 1 in FIG. 9. In other words, DU 40 judges that the precoding is performed at DU 40.

As described above, in base station 300, the information indicating the parameter used for the spatial processing performed by DU 40 (e.g., matrix information), and the information indicating the type of the spatial processing corresponding to the aforementioned parameter (e.g., type information) are sent from CU 30 to DU 40 over the FH interface that connects CU 30 to DU 40 that performs radio transmission of the DL signal to terminal 200. DU 40 determines the content of the spatial processing indicated in the matrix information based on the type information.

In other words, CU 30 indicates the parameter related to spatial processing of different content to DU 40 by switching the values of the type information without changing the format of matrix information (in other words, using the same format). DU 40 interprets the content of the matrix information in accordance with the type information indicated from CU 30.

Accordingly, CU 30 can indicate the control information to DU 40 using the common interface in the C-Plane or U-Plane even when the control information (e.g., matrix information) to be indicated to DU 40 is different depending on the functions that CU 30 has and the functions that DU 40 has.

In other words, the control information to be indicated from CU 30 to DU 40 can be suitably indicated over the FH interface using the common control information for the various combinations of the functions of CU 30 and DU 40. Therefore, base station 300 can send a signal efficiently over the FH interface that connects different units in base station 300 (e.g., CU 30 and DU 40) to each other according to the present embodiment.

Other Embodiment

Note that, the CU may also be referred to as an aggregate node, aggregate base station, signal processing device, Baseband processing Unit (BBU), or master station. Note also that, the DU may also be referred to as a distributed node, extension station, Radio Unit (RU), remote installation base station, transmission point, or slave station.

(Hardware Configuration)

The block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 11:
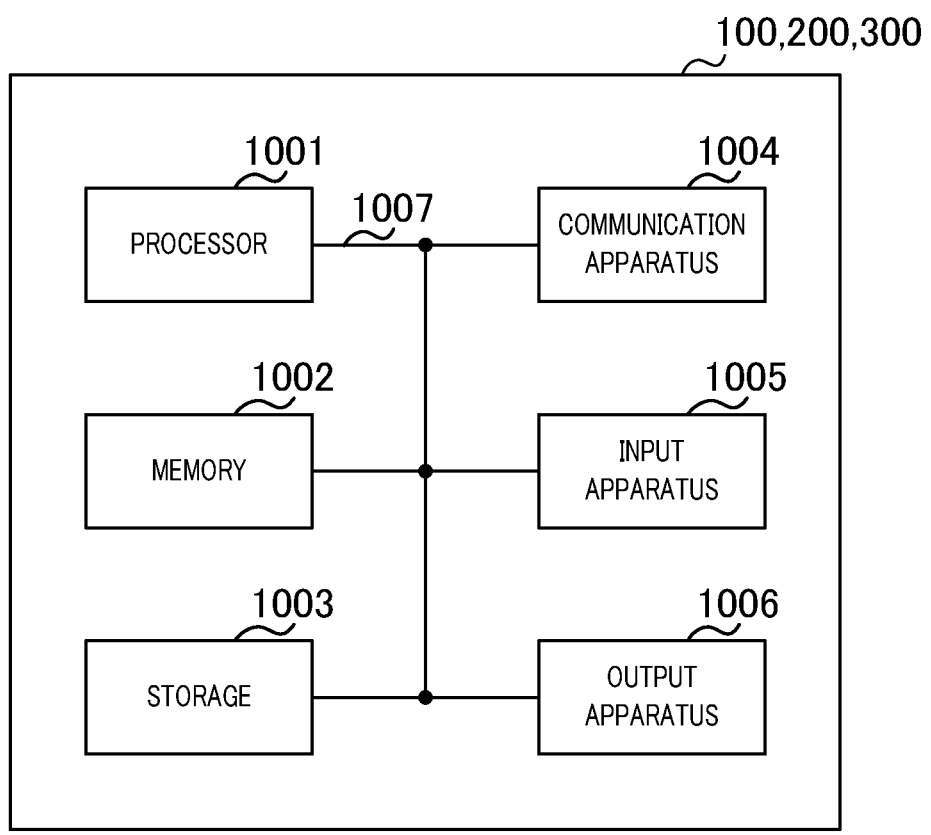
FIG. 11 illustrates an example of hardware configuration of the base station and the terminal.

For example, the base station, terminal, and the like according to an embodiment of the present disclosure may function as a computer that executes processing of a radio communication method of the present disclosure. FIG. 11 illustrates an example of a hardware configuration of base stations 100 and 300 and terminal 200 according to an embodiment of the present disclosure. Physically, base stations 100 and 300 and terminal 200 as described above may be a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configuration of base stations 100 and 300 and terminal 200 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in base stations 100 and 300 and terminal 200 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control sections 11, 21, 31, and 41, physical layer processing sections 12 and 23, and the like as described above may be implemented by processor 1001. In addition, the aforementioned table may be stored in memory 1002.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, at least part of the functional blocks constituting base stations 100 and 300 and terminal 200 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be called a register, a cache, a main memory (main storage apparatus), or the like. Memory 1002 can save a program (program code), a software module, and the like that can be executed to carry out the radio communication method according to an embodiment of the present disclosure.

Storage 1003 is a computer-readable recording medium and may be composed of, for example, at least one of an optical disk such as a Compact Disc ROM (CD-ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, communication sections 13 and 22, radio processing section 24, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, base stations 100 and 300 and terminal 200 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, Downlink Control Information (DCI) and Uplink Control Information (UCI)), higher layer signaling (for example, Radio Resource Control (RRC) signaling, Medium Access Control (MAC) signaling, broadcast information (Master Information Block (MIB) and System Information Block (SIB)), and other signals. The RRC signaling may be called an RRC message and may be, for example, an RRC connection setup message, an RRC connection reconfiguration message, or the like.

(Adaptive System)

The aspects and embodiments described in the present specification may be applied to a system using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, Mobility Management Entity (MME) or Serving Gateway (S-GW)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, Physical Uplink Control Channel (PUCCH) and Physical Downlink Control Channel (PDCCH)) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station", "eNB", "cell", and "sector" can be interchangeably used in the present specification. The base station may be called a fixed station, a NodeB, an eNodeB (eNB), an access point, a femto cell, a small cell, or the like.

(Terminal)

The terminal may be called, by those skilled in the art, a user terminal, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or a User Equipment (UE) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard.

The correction RS may be called a Tracking RS TRS), a Phase Compensation RS (PC-RS), a Phase Tracking RS (PTRS), or an additional RS. The demodulation RS and the correction RS may be called by other corresponding names, respectively. The demodulation RS and the correction RS may be specified by the same name (for example, demodulation RS).

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (Orthogonal Frequency Division Multiplexing (OFDM)) symbol, Single Carrier-Frequency Division Multiple Access (SC-FDMA) symbol, or the like) in the time domain.

The radio frame, the subframe, the slot, and the symbol indicate time units in transmitting signals. The radio frame, the subframe, the slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a Transmission Time Interval (TTI).

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiments described in the present specification. Modifications and variations of the aspects of the present disclosure can be made without departing from the spirit and the scope of the present disclosure defined by the description of the appended claims. Therefore, the description of the present specification is intended for exemplary description and does not limit the present disclosure in any sense.

The disclosure of Japanese Patent Application No. 2018-099056, filed on May 23, 2018, including the specification, drawings, and abstract is incorporated in its entirety into this patent application.

INDUSTRIAL APPLICABILITY

One aspect of the present disclosure is useful for a mobile communication system.

REFERENCE SIGNS LIST 10, 30 CU
20, 40 DU
11, 21, 31, 41 Control section
12, 23 Physical layer processing section
13, 22 Communication section
24 Radio processing section
100, 300 Base station
200 Terminal

The invention claimed is:

1. A base station, comprising:
a Radio Unit (RU) that wirelessly transmits a signal to a terminal;
a Distributed Unit (DU); and
an interface that connects the RU to the DU,
wherein function information indicating a function that the RU has is sent from the RU to the DU,
wherein the function information includes a first parameter indicating whether or not the RU has a function of precoding,
wherein the function information further includes a second parameter indicating whether or not the RU has a function of digital beamforming, and
wherein the function information further includes an additional parameter indicating a beam identifier.

2. A base station, comprising:
a Radio Unit (RU) that wirelessly transmits a signal to a terminal;
a Distributed Unit (DU); and
an interface that connects the RU to the DU,
wherein function information indicating a function that the RU has is sent from the RU to the DU,
wherein the function information includes a first parameter indicating whether or not the RU has a function of precoding,
wherein when the RU and the DU have the function of the precoding, the RU is determined as a unit that performs the precoding, and
wherein the function information further includes an additional parameter indicating a beam identifier.

* * * * *